No. 732,062. PATENTED JUNE 30, 1903.
J. B. ENTZ.
POWER TRANSMISSION AND CONTROL.
APPLICATION FILED MAR. 29, 1898.
NO MODEL. 5 SHEETS—SHEET 1.
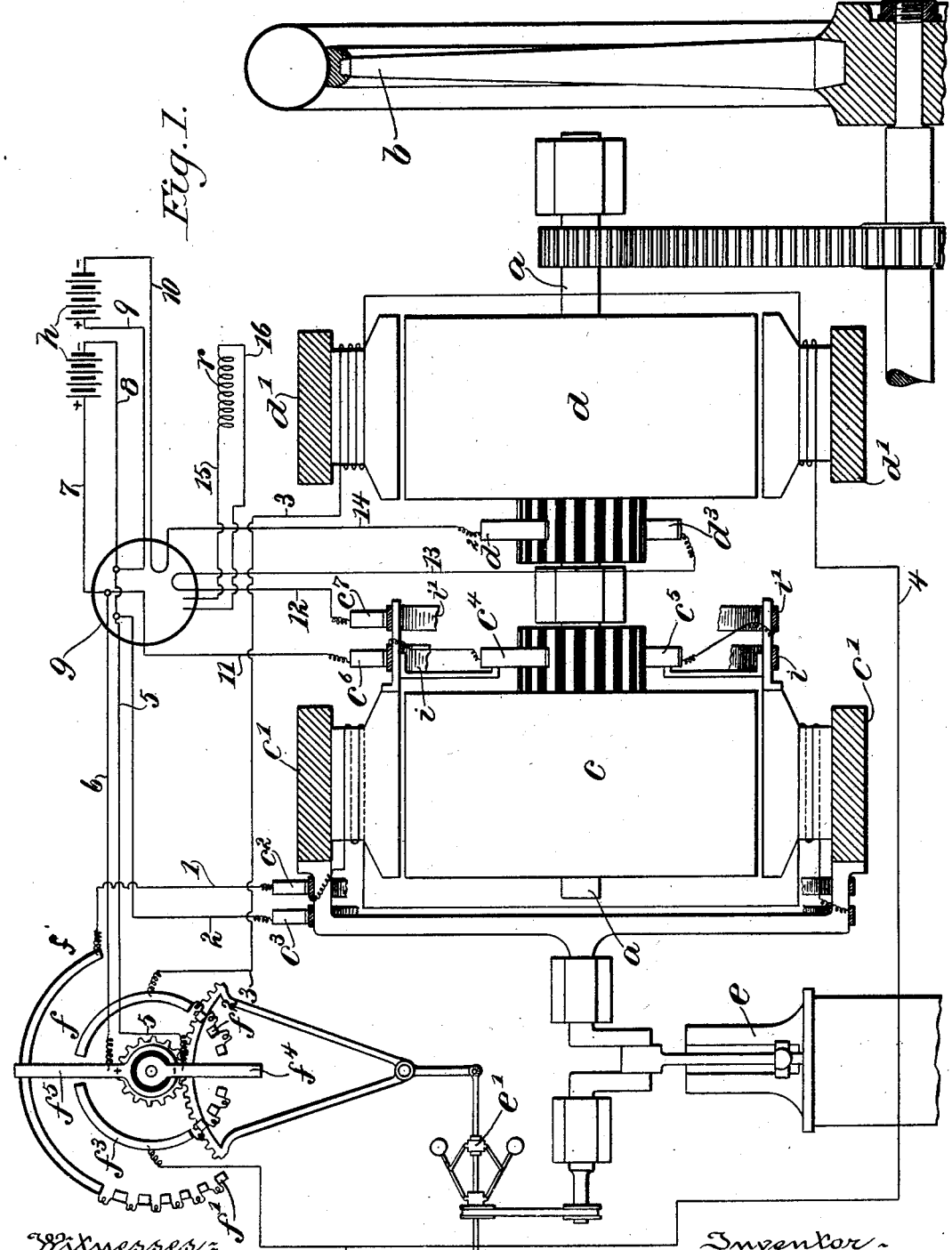

No. 732,062. PATENTED JUNE 30, 1903.
J. B. ENTZ.
POWER TRANSMISSION AND CONTROL.
APPLICATION FILED MAR. 29, 1898.
NO MODEL. 5 SHEETS—SHEET 2.
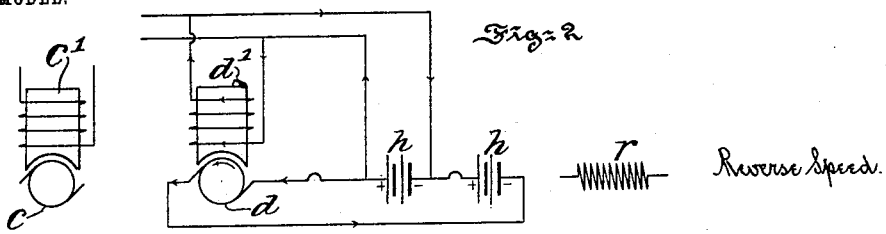
Fig. 2. Reverse Speed.
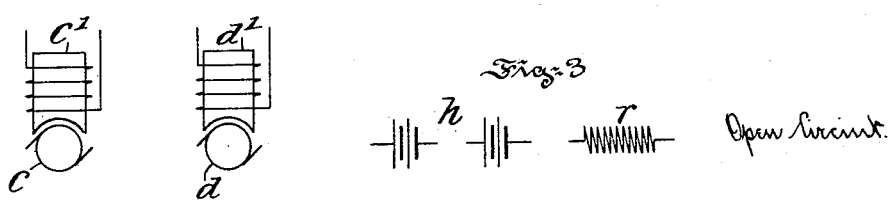
Fig. 3. Open Circuit.
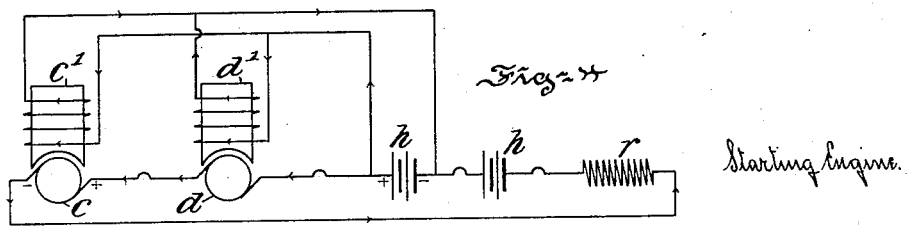
Fig. 4. Starting Engine.
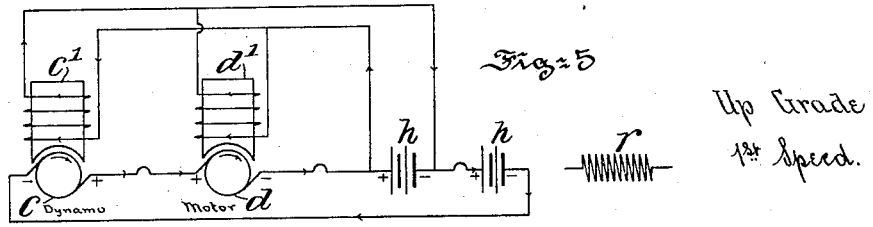
Fig. 5. Up Grade 1st Speed.
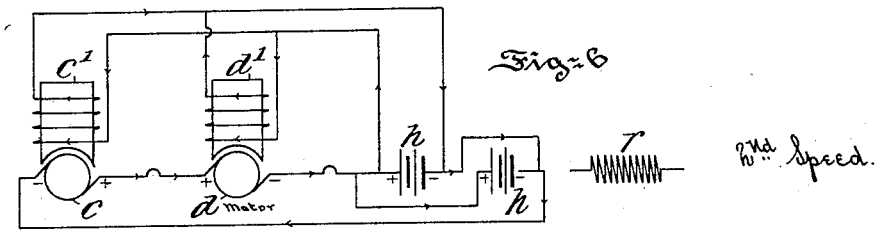
Fig. 6. 2nd Speed.
Witnesses:
W. B. Jackson
K. M. Gilligan
Inventor:
Justus B. Entz
By Augustus B. Stoughton
Attorney

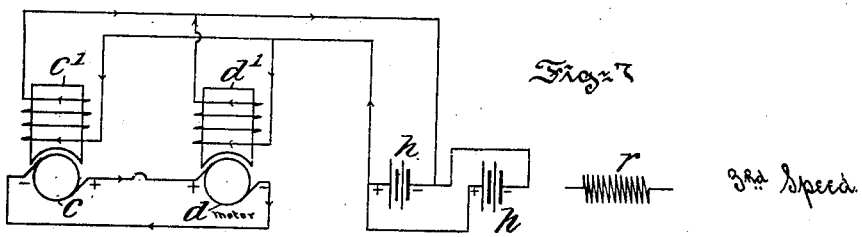
Fig. 7. 3rd Speed.
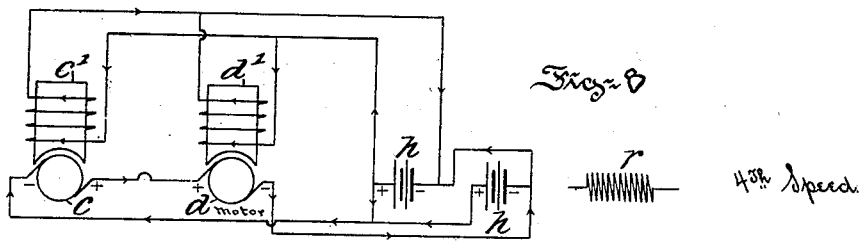
Fig. 8. 4th Speed.
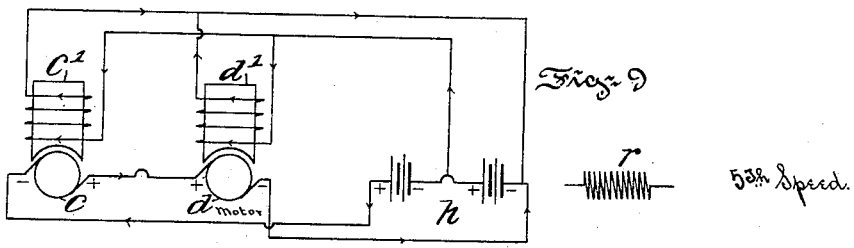
Fig. 9. 5th Speed.
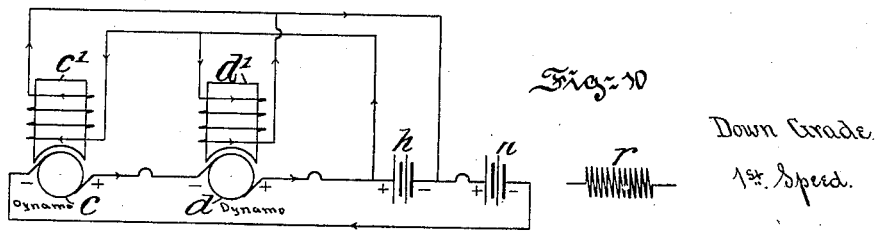
Fig. 10. Down Grade 1st Speed.
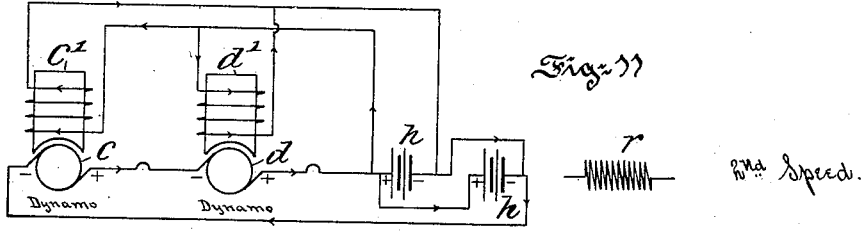
Fig. 11. 2nd Speed.

No. 732,062. PATENTED JUNE 30, 1903.
J. B. ENTZ.
POWER TRANSMISSION AND CONTROL.
APPLICATION FILED MAR. 29, 1898.
NO MODEL. 5 SHEETS—SHEET 4.
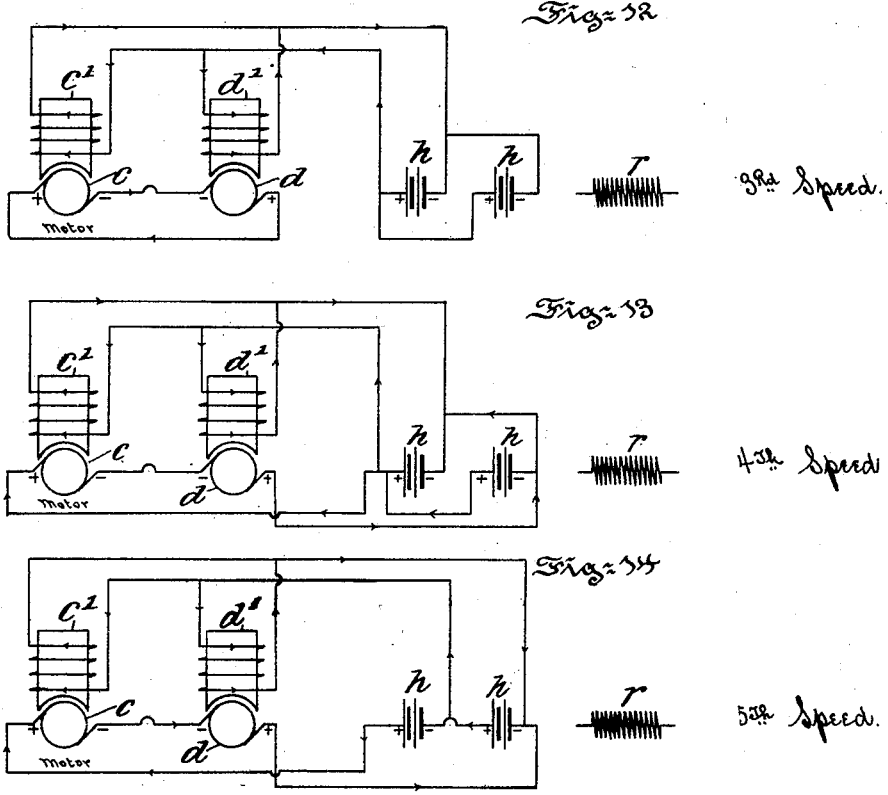

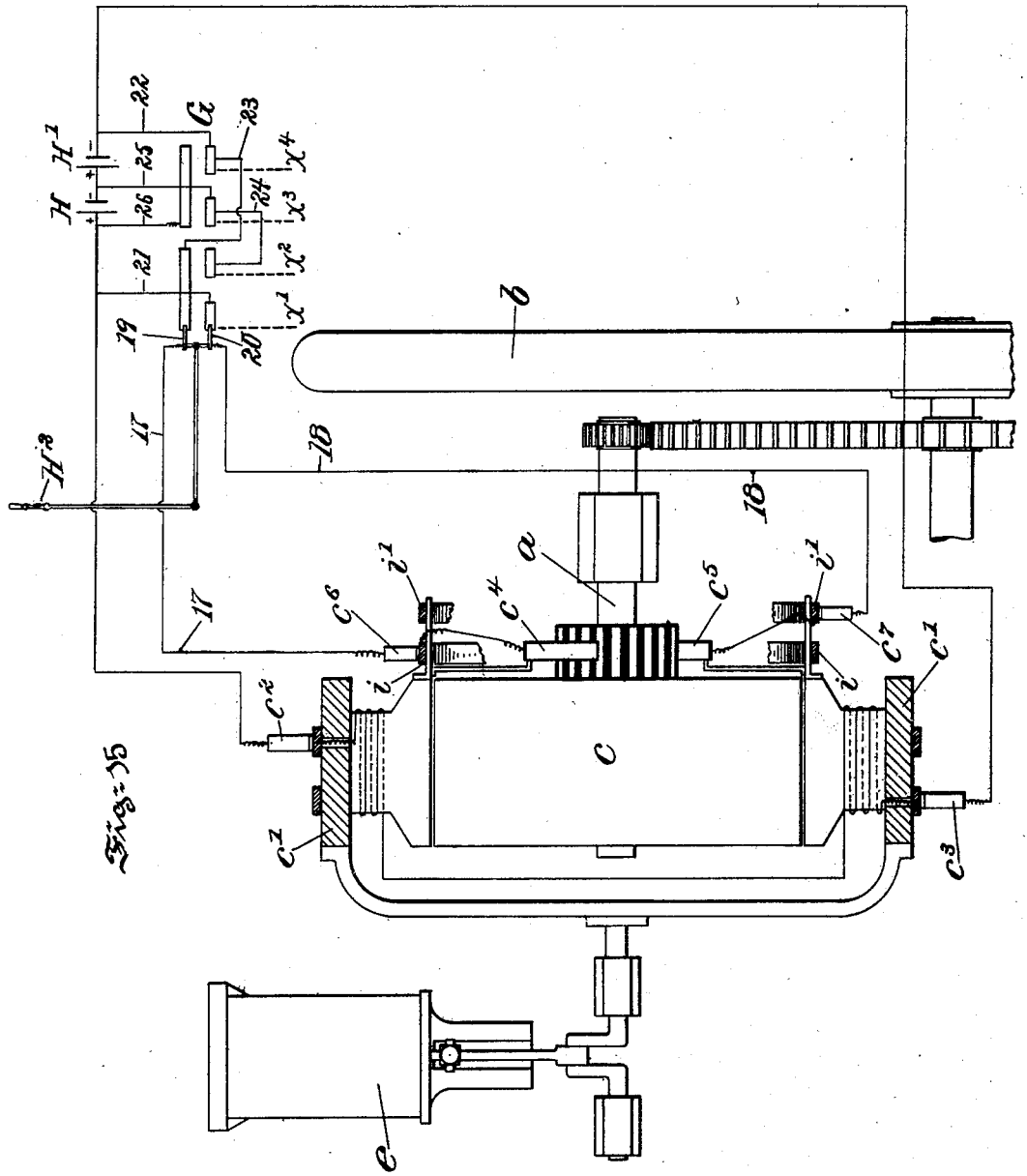

No. 732,062. Patented June 30, 1903.

UNITED STATES PATENT OFFICE.

JUSTUS B. ENTZ, OF PHILADELPHIA, PENNSYLVANIA.

POWER TRANSMISSION AND CONTROL.

SPECIFICATION forming part of Letters Patent No. 732,062, dated June 30, 1903.

Application filed March 29, 1898. Serial No. 675,550. (No model.)

*To all whom it may concern:*

Be it known that I, JUSTUS B. ENTZ, a citizen of the United States, residing at the city of Philadelphia, in the county of Philadelphia and State of Pennsylvania, have invented certain new and useful Improvements in Power Transmission and Control, of which the following is a specification.

Objects of the present invention are, first, to electrically effect and control the transmission of power from any prime mover or driver to the driven part in such manner that the torque and speed of the driven part may be varied without varying the torque of the prime mover or driver; second, to subtract from and, if desired, add to the power delivered to the driven part without changing the load on the prime mover or driver; third, to automatically change the speed and torque ratio in the transmission of power from an engine to a vehicle and to electrically add to or subtract from the torque or speed in the transmission, whereby a steady load of the average power required to propel the vehicle is kept on the engine, permitting gas-engines or similar prime movers to be most advantageously and efficiently used and controlled, and, fourth, to provide means of electrical control of the speed and power delivered from a mechanical prime mover to a driven part.

The invention comprises the improvements hereinafter described and claimed.

The nature, characteristic features, and scope of the invention will be more fully understood from the following description, taken in connection with the accompanying drawings, forming part hereof, and in which—

Figure 1 illustrates diagrammatically an apparatus for propelling a road-vehicle, although it must be borne in mind that the invention is susceptible of embodiment and use for different purposes and with many modifications. Figs. 2 to 14 are diagrammatic views illustrative of circuits hereinafter described, and Fig. 15 is a diagrammatic view illustrating a modification embodying features of the invention.

In the drawings, $a$ is a driving-shaft, geared or otherwise adapted to transmit power to the driving-wheels $b$ of a vehicle or to any other driven part. The armatures $c$ and $d$ are mounted on or otherwise connected with said shaft. The field $d'$ of the armature $d$ is stationary, and the field $c'$ of the armature $c$ is connected with and turned by the driver or prime mover, which in the present instance is assumed to be a gas-engine $e$, to the crank-shaft of which this field $c'$ is connected. Although the armature of each dynamo-electric machine is shown as mounted on the shaft $a$, still the field of either machine might be mounted on the shaft, and in such event the armature would be connected with the gas-engine in one case and would be stationary in the other case.

$f$ is a field-regulator that may be operated by means of a governor, as $e'$, on the gas-engine.

$g$ designates a controller by means of which the speed and direction of motion of the vehicle are regulated.

$h$ is a storage battery that may or may not be used.

All of the described apparatus in the case of a vehicle is mounted on and carried by it.

Inasmuch as the circuits, field-regulator, battery, and controller may be variously constructed and arranged and, at least in part, omitted or replaced by other types of apparatus, a description will be given of the operation and relation of the principal parts before the various circuits are traced, and in this connection reference will be made to the drawings and to the use of the invention in connection with a vehicle.

The full horse-power of the engine $e$ is exerted upon and transmitted by way of the armature $c$ and tends to revolve it. The driving effort of the gas-engine $e$ is transmitted to the driving-shaft $a$ through the medium of the armature $c$ and field-magnets $c'$. To accomplish this, a current must be maintained through the armature $c$, whose circuit is completed from brush to brush, and in this circuit the armature $d$ and the battery $h$ may be included and the field-magnets $c'$ must be energized, and this tends to rotate the armature $c$ forward in the same direction as that of the engine and its field-magnet $c'$. Whatever the speed of the armature $c$ and of the driving-shaft $a$ on which it is mounted, the current in the armature $c$ must for a given strength and direction of magnetic field of force of the field-magnets $c'$ be always in the same direction and of the same amount in order to cause the armature $c$ to react upon its field-magnets $c'$ always in the same direction and with the same force, and thus keep the engine $e$ working under constant load. To maintain the above-described current through the circuit of the armature $c$, there must be generated somewhere in said circuit an electromotive force of the proper direction and amount and in excess of all opposing electromotive forces by the amount necessary to maintain said current through the resistance of the circuit. This electromotive force is induced either in the armature $c$ itself by turning at a lower speed than its field-magnets $c'$ or by the armature $d$ or the battery $h$, either in whole or in part. When the driving effort required by the state of the grade on which the vehicle is running is equal to the driving force of the engine as transmitted through the armature $c$ to the driving-shaft $a$, the armature $d$ is playing no useful part and need not be included in the circuit of the armature $c$, and the armature $c$ is slipping to generate the proper electromotive force for maintaining said current, provided that the battery $h$ is not included in the circuit. When the driving effort required for the propulsion of the vehicle needs to be increased or diminished, the armature $d$ is included in the same circuit as the armature $c$ and the field-magnet $d'$ is automatically energized to the proper degree and in the proper direction for either assisting or retarding the rotation of the armature $d$, and thus either assisting the driving effort of the armature $c$ as a motor or resisting it by absorbing power as a dynamo. The field strength and direction of the field-magnet $d'$ is controlled by the rheostat $f$, whose circuits will be described later and which is operated by a centrifugal governor $e'$ on the engine. When the engine starts to slow down by reason of an increase of load, this rheostat causes the field-magnet $d'$ to be energized in the proper direction and to the proper degree for making the parts $d\ d'$ operate as a motor. An increase of speed of the engine due to a decrease of load operates the rheostat $f$ to cause the field-magnet $d'$ to be energized in the opposite direction and to the proper degree, making a dynamo of the parts $d\ d'$. The driving effort exerted upon the shaft $a$ by the engine $e$ through the intervention of the dynamo-electric machine $c\ c'$ is constant, and any variation in driving effort from this amount must be accomplished through the action of the dynamo-machine $d\ d'$ on the shaft $a$.

When the dynamo-electric machine $d\ d'$ is taking power from the driving-shaft $a$ and operating as a dynamo, it furnishes an additional electromotive force to the circuit and allows the armature $c$ to increase its speed to an extent sufficient to reduce the electromotive force generated in it by the amount of electromotive force furnished by the machine $d\ d'$, and thus still keep the current in the armature-circuit constant. In this way the armature $c$ may speed up even to the extent of running faster than its field, in which case it would be running as a motor and without decreasing the current in its circuit, provided that the machine $d\ d'$ adds sufficient electromotive force in excess of the counter electromotive force which the armature $c$ would then generate. When the machine $d\ d'$ is assisting in the rotation of the shaft $a$, and therefore acting as a motor, it develops a counter electromotive force in the armature-circuit which must be overcome by a greater slip of the armature $c$ in respect to its field $c'$, in which case $c\ c'$ is acting as a dynamo to balance such counter electromotive force of $d\ d'$, and thus keep the proper current in the armature-circuit. Thus increase of driving effort is accomplished by running the dynamo-machine $d\ d'$ as a motor to give extra driving force and by taking electrical power for this purpose from the armature $c$ by running it at a lower speed than the engine. In this way part of the work of the engine delivered to the armature $c$ is transmitted as mechanical power to the shaft at a lower speed and the balance of the work represented by loss in speed of the armature $c$ is transformed into electrical energy and delivered to the dynamo-electric machine $d\ d'$ to run it as a motor. The result of this is that the shaft $a$ runs at less speed and higher driving effort, and also when the driving effort of the engine is greater than is required to propel the vehicle the dynamo-electric machine $d\ d'$ is run as a dynamo driven by the excess of effort of the shaft $a$ and caused to deliver its electrical energy to the armature $c$, which transforms it into mechanical work by speeding up and running faster than it would be driven by the engine alone. The result of this is that the shaft $a$ runs at a higher speed and less effort. By these means the work delivered by the driving-shaft $a$ comes entirely from the engine, which runs at a constant speed and with a constant rotary effort, and this work may be represented at the shaft $a$ by a high driving effort and a low speed, or a low driving effort and a high speed, or any combination of speed and effort which represents the horse-power of the engine.

It is obvious that the effect of the above-described apparatus is to transmit the power of the engine, which is run under conditions of constant speed and rotary effort to the driving-shaft $a$, which is automatically made to adapt its driving effort to the load on the vehicle, the shaft $a$ varying inversely in speed to the variation of its driving effort. The effect is the same as that of a changeable-ratio gearing, by which greater driving effort is obtained at the expense or loss of speed, and vice versa. Thus the speed is fixed for any given condition of grade and can only be increased by the addition of power in excess of the power of the engine and can only be decreased by diverting some of the power of the engine from the driving-shaft $a$. This is accomplished by means of the battery $h$, which through the intervention of the controller $g$ may be included in the armature-circuit at various voltages and in either direction. When the battery is included in the armature-circuit in such manner that its electromotive force is in the same direction as the electromotive force necessary for maintaining the described current, it increases the speed of the armatures $c$ and $d$ and of the shaft $a$ by that amount, which will decrease their net electromotive force of the same direction by the same amount as the added battery electromotive force. Under these conditions the battery is discharging. When the battery is placed in the armature-circuit in the opposite direction, its electromotive force is opposed to the flow of the described current and the armatures must run slower in order to generate the additional electromotive force which the battery opposes. Under these conditions the battery is being charged by the current which is flowing through it. If it is desired to run the vehicle at a slower rate of speed than is accomplished by the full opposing electromotive force of the battery, the resistance $r$ may be introduced into the armature-circuit in series with the battery. The drop of potential in this circuit serves the same purpose as the counter electromotive force of the battery.

Circuits adapted for use in connection with a vehicle will now be described in connection with Fig. 1. The conductor 1 extends from the field $c'$, for example, by way of a brush $c^2$ to the end contact of the rheostat portion $f'$ of the field-regulator $f$. The conductor 2 extends by way of the brush $c^3$ from the field $c'$ to the controller $g$. The conductor 3 extends from the field $d'$ to the rheostat portion $f^2$ of the field-regulator, and the conductor 4 extends from the field $d'$ to the rheostat portion $f^3$. The conductor 5 extends from one of the contact-arms $f^4$ of the field-regulator to the controller, and the conductor 6 extends from the other contact-arm $f^5$ of the field-regulator to the controller. These conductors comprise the circuit for the excitation and control of the field-magnets $c'$ and $d'$. The conductors 7 and 8 extend from one group of battery-cells to the controller, and the conductors 9 and 10 extend from another group of battery-cells to the controller, so that different portions of cells of battery may be included in or excluded from circuit, as will be hereinafter described. Although two groups of battery-cells are shown, nevertheless their number may be increased or diminished. The armature-conductors 11 and 12 extend from the commutator-brushes $c^4$ and $c^5$ of the armature $c$ by way of contact-rings $i$ and $i'$ and stationary brushes $c^6$ and $c^7$ to the controller $g$. The armature-conductors 13 and 14 extend from the commutator-brushes $d^2$ and $d^3$ of the armature $d$ to the controller $g$. The conductors 15 and 16 connect the terminals of the resistance $r$ with the controller $g$. These conductors provide for the circuit of the armatures $c$ and $d$, the battery $h$, and the resistance $r$, which are grouped in different combinations by means of the controller $g$ for varying the speed of the vehicle.

The connections through the controller $g$ (shown in the drawings, Fig. 1) are those which occur when the full driving effort of the engine is being transmitted through the armature $c$ to the driving-wheels $b$ without aid or retardation from the armature $d$ and at the highest speed, which is with the battery discharging in series through the armature-circuit.

The rheostat $f$ is shown in the position where the field $d'$ is not excited, and therefore exercises no influence upon the current carried by the armature $d$.

The circuits due to the different positions of the controller are illustrated diagrammatically in Figs. 2 to 9. In each of these figures the field-circuits, which are controlled by the rheostat $f$ and are independent of the position of the controller $g$, are shown as if the vehicle were ascending a grade greater than the driving effort of the engine alone is equal to, and consequently $d\,d'$ is acting as a motor.

In Figs. 10 to 14 the same speed positions of the controller are illustrated as in Figs. 5 to 9; but in this case the field-circuits are shown under the condition of the vehicle proceeding on a lighter grade than requires the full power of the engine, and where, consequently, $d\,d'$ is acting as a dynamo.

Fig. 2 illustrates the reverse-speed position of the controller. The armature $c$ is not in circuit, and the machine $d\,d'$ is driven as a motor from the battery $h$, the two groups of batteries being shown in series. In this position of the controller the engine $e$ should be throttled to prevent its running away.

Fig. 3 illustrates the open-circuit position on the controller in which the circuits are all broken.

Fig. 4 represents the position in which the engine is started automatically, and the armature $c$ and $d$, the battery $h$, and the resistance $r$ are all in series. The direction of current flowing through the armature $c$ is such as would tend to turn it backward, or its field, which is attached to the engine, forward. The latter condition is the one that results, as the field and engine move more easily than the armature $c$, which is keyed to the driving-shaft. The result of running the engine forward is, if the proper valves have been opened, to give it its first explosive impulse, after which it rapidly runs up to full speed, revolving sufficiently faster than the stationary armature $c$ to develop an electromotive force in it greater than that of the battery $h$, and thus to cause reversal of the direction of the current in the circuit, thereby charging the battery $h$ and also tending to revolve the armature $c$. If the brake is applied to the vehicle, it may be standing in this position and the battery be charging. It is also provided, however, that the speed of the engine under this condition is such that the governor $e'$ would operate to move the rheostat $f$ into such a position as to make the field-magnet $d'$ react upon its armature in an effort to turn it in the opposite direction to that of the armature $c$.

Fig. 5 illustrates the first running speed of the vehicle, and the connections are the same as in Fig. 4, with the exception that the resistance $r$ is cut out of the circuit, allowing the armature $c$ to speed up to the point where the electromotive force developed in it is decreased by the amount of the drop of electromotive force in the resistance $r$.

Fig. 6 illustrates the second speed of the vehicle and shows the two groups of batteries connected in parallel, allowing the armature $c$ to speed up still further, due to the decrease of the opposing battery electromotive force.

Fig. 7 illustrates the third speed of the vehicle and shows the battery cut out of the armature-circuit, whereby the armature $c$ still further speeds up until the electromotive force induced in it is only sufficient to overcome the drop in the circuit and the counter electromotive force in the armature $d$, which is running as a motor because of the direction of its field-magnet excitation.

Fig. 8 illustrates the fourth speed position of the controller and shows the two battery groups in parallel included in the armature-circuit in the opposite direction to the previous positions and so that its electromotive force is in the same direction as the armature $c$. Under these conditions the armature $c$ still further speeds up until its combined electromotive force with the battery is equal to the drop in the circuit plus the counter electromotive force of the armature $d$.

In Fig. 9 the highest speed position of the controller is shown, in which the battery is discharging with the two groups in series, in which case a further speed of the armature $c$ results to the point where the combined electromotive forces of the armature $c$ and battery $h$ are equal to the drop in the circuit plus the counter electromotive force in the armature $d$. The amount of counter electromotive force developed by the armature $d$ depends on the strength of its field-magnet $d'$, and if this counter electromotive force is greater than the electromotive force of the battery the armature $c$ must be still running slower than its revolving field-magnet in order to generate an electromotive force to add to that of the battery in overcoming the counter electromotive force of $d$ and the drop in the circuit. It is this state of affairs that is illustrated in Fig. 9, where the plus and minus marks show $c$ to be operating as a dynamo and $d$ as a motor. The current for exciting the field-magnets $c'$ and $d'$ in Figs. 2, 4, and 5 is taken from the terminals of one of the groups of batteries and in Fig. 9 from the other group. This is done in order to take the current for excitation of the fields as evenly as possible from each group of batteries. In Figs. 6, 7, and 8 the batteries are in parallel, and therefore furnish current equally for the field-circuit. All these speed positions are illustrated with the machine $d\ d'$ acting as a motor, because the vehicle is on a grade which requires more than the full torque of the engine to drive it, and therefore has slowed down to the required extent for causing the governor $e'$ to operate the rheostat $f$ to a sufficient amount to make $d\ d'$ a motor with sufficient driving effort to furnish the additional torque required for driving the vehicle.

Figs. 10 to 14 show the same five speed positions of the controller as are illustrated in Figs. 5 to 9, but show the machine $d\ d'$ acting as a dynamo, because the vehicle is on a grade which requires less than the full driving effort of the engine, and in this case the speed of the engine $e$ has increased by an amount sufficient to cause the governor $e'$ to shift the rheostat in the opposite direction and to the extent of causing $d\ d'$ to become a dynamo and putting an additional driving effort upon the shaft $a$ sufficient to restore the full load upon the engine. In the first two speed positions, Figs. 10 and 11, as the battery is in the charging position the armature $c$ is acting as a dynamo developing an electromotive force in series with the armature $d$, which is also acting as a dynamo to overcome the electromotive force of the battery. In the third speed position and under these conditions, as illustrated in Fig. 12, the battery being cut out of circuit and the armature $d$ assisting in the flow of the current, the armature $c$ has speeded up to a higher speed than its revolving field, thereby developing a counter electromotive force and operating as a motor. In Figs. 13 and 14 the armature $c$ is still acting as a motor, but is speeded up to a still greater extent, developing a greater counter electromotive force, because the battery $h$ is included in the circuit in the direction to add to the electromotive force developed by the armature $d$. When the machine $c\ c'$ is running in this manner, it is equivalent to an electric motor with its field-magnets revolved by an outside power and in the same direction as the revolving of the armature, in which case the mechanical energy transmitted to its shaft is partly represented by its input of electrical energy and partly by the mechanical energy applied to rotating its field. It will be noticed that the rheostat $f$ does not change direction of excitation of the field-magnet $c'$, which is always in the same direction, and that $c\ c'$ becomes a dynamo or a motor, depending on whether its armature $c$ is revolving slower or faster than its revolving field-magnet $c'$, while on the other hand the armature $d$, always revolving in the same direction in relation to its field-magnet, becomes a motor or dynamo only by change of the direction of its field excitation.

The mode of operation of apparatus embodying my invention may be described in connection with a moving vehicle or carriage, as follows: The connections shown in Fig. 1 are those which occur when the full driving effort of the engine is being transmitted from the armature $c$ to the driving-wheels $b$ without aid or retardation from the armature $d$ and the rheostat $f$ is in the position where the field-magnet $d'$ is not excited in either direction and the controller is on the highest speed position which is with the battery discharging in series through the armature-circuit. Under these conditions the machine $c\,c'$ is running as a motor, its counter electromotive force opposing the electromotive force of the battery $h$—that is, the armature $c$ is running forward at a higher speed than its field-magnet $c'$ is driven by the engine. When the vehicle encounters a greater upgrade, the tendency is for it to slow down. Under these circumstances the armature $c$ runs at a slower speed, thus diminishing its counter electromotive force, and a greater current starts to flow through the armature-circuit, which in the speed position of the controller shown may be indicated as follows: starting from commutator-brush $c^5$, through collector-ring $i'$, to brush $c^7$, conductor 12, through conductor $g$ to conductor 13, through armature $d$ to conductor 14, through controller $g$, through two groups of battery $h$, in series, by conductors 10 9 8 7, through controller $g$ to conductor 11, and through armature $c$ to the starting-point. This greater current flowing through the armature $c$ puts a greater load on the engine, which slows down slightly. This change in speed operates upon the governor $e'$ and causes it to shift the field-regulator arm $f^4$ toward the right into position for closing the circuit of the field $d'$, which may be traced as follows: from rheostat portion $f^2$ through contact-arm $f^4$, 5, $g$, 8, battery $h$, 7, $g$, 6, contact-arm $f^5$, $f^3$, 4, field $d'$, 3, $f^2$, and back to arm $f^4$. The described closing of this field-circuit energizes the field-magnets $d'$ and causes the armature $d$ to operate as a motor and help in the rotation of the shaft $a$, thus relieving the load on the engine and operating the vehicle at a proportionally lower speed, as above described. When a lighter grade is encountered, the described operation is in the reverse direction—that is to say, the shaft $a$ commences to run faster, the current in the armature-circuit decreases, and the engine tends to speed up. The increase of speed of the engine causes the field-regulator arm $f^4$ to be shifted toward the left into position for energizing the field-magnets $d'$ in the opposite direction to that above described and by the same path starting from $f^4$ to $f^3$. Under these circumstances the parts $d$ and $d'$ operate as a dynamo and restore the load on the engine and the vehicle is operated at a proportionally higher speed, as above described. The speed at which the vehicle may be running when it encounters a change of grade depends upon the manner in which the battery $h$ is connected with the armature-circuit and will not affect or change the above-described operation, which occurs when the heavier or lighter grade is encountered. Since the effect of a change of grade is not only to slow down or accelerate the speed of the engine, but also to effect a change of current in the armature-circuit, it follows that the change of current in that circuit may be availed of for operating a field-regulator instead of employing a governor which responds to changes of engine speed Reference has been made to the use of a battery for taking current from and adding it to the armature-circuit. However, a resistance, as $r$, may be employed either with or without a battery for cutting down the speed of the vehicle. When such resistance is introduced into the armature-circuit, the path of the latter may be traced as follows: $c^5$, $c^7$, 12, 13, $d^3$, $d^2$, 14, 15, $r$, 16, 11, $c^6$, $c^4$. The maximum effort is obtained on the driving-shaft $a$ when the field-magnets $d'$ are energized to their utmost extent by cutting out all of the resistance interposed in their field-circuit by the rheostat $f$. An increase over this amount can only be accomplished by increasing the current through the armature $d$; but this is only permissible when the field strength of the field-magnet $c'$ is decreased; otherwise the current in the armature $c$ (which is in circuit with the armature $d$) must increase with it and would react upon the engine and put too great a load upon it. It has been explained that there is only one definite current that can be carried by the armature $c$ for a given field strength of field-magnets $c'$ in order to properly load the engine, but by decreasing the strength of the field-magnets $c'$ the current through the armature $c$, and consequently the current in the armature $d$, may be increased without overloading the engine. This is accomplished in the following manner: After the rheostat-arm $f^4$ has cut out all of the resistance in the field-circuit of the field-magnets $d'$, and thus brought them to their maximum strength, and consequently to their greatest driving effort, a further movement of the rheostat-arm by the governor $e'$ commences to interpose resistance in the circuit of the field-magnets $c'$, thus allowing an increase of current through the armatures $c$ and $d$. The path of the circuit of the field-magnet $c'$, which is always energized in the same direction, may be traced as follows: starting at collector-brush $c^2$, to the conductor 1, by the rheostat portion $f'$, to the rheostat-arm $f^5$, conductor 6, $g$, 7, battery $h$, 8, $g$, 2, $c^3$, field-winding $c'$ back to $c^2$.

Among the many advantages of the described invention the following may be mentioned: The gas-engine operates under substantially uniform conditions of speed and effort. The available speed and effort of the gas-engine are relatively transmitted to accommodate the varying conditions of load at the traction-wheels by means of electrical apparatus, which may be automatically controlled and made to receive, if desired, energy from a battery at times when a greater speed is required and to store energy at times when a less speed is desired.

The construction and mode of operation of the modification illustrated in Fig. 15 are as has been described with reference to Fig. 1, except as follows: In Fig. 15 the dynamo-electric machine $d\ d'$ is omitted and only the rotary effort of the engine can be transmitted to the driven part. However, the speed of the driven part may be varied without varying the speed of the engine $e$. This is accomplished by means of the battery H H', which is included in the armature-circuit $c$, and by means of the controller G the direction and amount of its voltage are varied. When the direction of the voltage of the battery H H' is in direction to oppose the electromotive force of the armature $c$, generated by its relatively slower movement than its field-magnet $c'$, the armature $c$ and shaft $a$ will run at a speed sufficiently lower than that of the field-magnet $c'$ to generate a voltage sufficient to overcome the opposing electromotive force of the battery H H'. If the controller G be moved so that the battery voltage is in the same direction as that which would be generated in the armature $c$ by its relatively lower speed than the field-magnet $c'$, the armature $c$ will speed up to a higher speed than that of its field-magnet $c'$, thereby creating a counter electromotive force to oppose the added electromotive force of the battery. Under these conditions the dynamo-electric machine $c\ c'$ is acting as a motor whose field-magnet is revolved from an outside mechanical source. The advantages of this combination are that the vehicle can be geared to a speed considerably lower than the maximum requires, and therefore for a given horse-power exert a larger driving effort. The increase in speed up to the maximum may be made by the battery discharging through the circuit of the armature $c$ and driving it as a motor faster than its field-magnet $c'$, which in turn is driven by the engine $e$, the net result being the sum of the mechanical power given by the engine $e$ and the electrical energy drawn from the battery H H' to operate the dynamo-electric machine $c\ c'$ as a motor. When it is required to drive the vehicle slower than would correspond to the speed of the engine $e$, the battery H H' by opposing its electromotive force to that of the armature $c$ is charged and receives energy from the dynamo-electric machine $c\ c'$, acting as a generator by having its field-magnet $c'$ driven faster than its armature $c$ by a difference in speed equal to that necessary to overcome the counter electromotive force of the battery H H'.

The controller G is shown with four positions, $x'$, $x^2$, $x^3$, and $x^4$. Each of these controller positions consists of contact-blocks connected with the terminals of the battery H H'. The two brushes $c^4$ and $c^5$ of the armature $c$ are connected through the contact-rings $i$ and $i'$ and the brushes $c^6$ and $c^7$ and the leads 17 and 18 to the controller-brushes 19 and 20, which are caused to slide from the controller positions $x'$, $x^2$, $x^3$, and $x^4$ by means of the handle H². When the controller is in the position $x'$, the two sections of the battery H H' are in series and opposed to the electromotive force of the armature $c$. In this case the armature $c$ is acting as generator to charge the battery H H' and the vehicle is running at a slower speed. The circuit may be traced as follows: starting at the commutator-brush $c^5$, to the contact-ring $i'$, contact-brush $c^7$, lead 18, controller-brush 20, lead 21, to the positive terminal of battery H, through batteries H and H', lead 22, lead 23, controller-brush 19, lead 17, contact-brush $c^6$, contact-ring $i$, and back to the commutator-brush $c^4$. When the controller is in the position $x^2$, one section of the battery H' is being charged, and the speed of the vehicle is higher by reason of less difference in speed being required between the field-magnet $c'$ and the armature $c$ to overcome the counter electromotive force of the battery. The circuit may be traced as follows: starting from commutator-brush $c^5$, by way of the contact-ring to controller-brush 20, to lead 24, to lead 25, to the positive terminal of battery H', to lead 22 23, controller-brush 19, and back to commutator-brush $c^4$. On the controller position $x^3$ battery H is introduced into the circuit with the voltage in the reverse direction to positions $x'$ and $x^2$, and in this case the battery is discharging and drives the armature $c$ as a motor faster than its field-magnet is revolved by the engine, in which case the driving-shaft $a$ is speeded up beyond the engine's speed. The circuit may be traced as follows: $c^5$, $i'$, $c^7_1$, 18, controller-brush 20 25, negative terminal battery H, positive terminal battery H, lead 26, controller-brush 19, 17, $c^6$, $i$, and back to the commutator-brush $c^4$. On the controller position $x^4$ the two sections of the batteries are discharging in series and the armature is driven as a motor at a still higher speed than its field-magnet $c'$, giving the vehicle its highest speed. The circuit is traced as follows: $c^5$, $i'$, $c^7$, 18, 22, negative of battery H', positive of battery H', negative of battery H, positive of battery H, lead 26, controller-brush 19, lead 17, $c^6$, $i$, and back to brush $c^4$.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and ob- jects of my invention, what I claim as new, and desire to secure by Letters Patent, is—

1. Power-transmission mechanism, comprising a device to which the full power is applied, which consists of two parts each movable, connections for delivering substantially the whole of the power at different relations of speed and effort factors and means whereby that factor of the applied power not required at the delivery connections is transformed into the required factor of the power and applied to the delivery connections.

2. Power-transmission mechanism, comprising a device to which the full power is applied and which consists of a generator-motor having its armature and field-magnet both rotatable, connections for delivering substantially the whole of the power at different relations of speed and effort factors, and means whereby that factor of the applied power not required at the delivery connections is transformed into the required factor of the power and applied to the delivery connections.

3. A changeable speed and torque device for power transmission to a driven part, having connections for receiving the available power and adapted to transmit it to the driven part at varying speed and torque relations as desired and which consists of an element having two parts both rotatable and capable of running at a speed difference, and of developing a reactive effort between its parts, one of said parts being connected to the driven part, a power device connected with the other of said parts, and capable of opposing the reactive effort developed between said parts, and means coöperating with said element whereby that factor of power not required at the driven part may be transformed into the required factor of the power and applied to the driven part.

4. A changeable speed and torque device for power transmission to a driven part having connections for receiving the available power and adapted to transmit it to the driven part at varying speed and torque relations as desired, and which consists of a generator-motor having its field and armature both rotatable and capable of running at a speed difference, and of developing a reactive effort between its field and armature, one of which is connected to the driven part, a power device connected with the other part of said generator-motor and capable of opposing the reactive effort developed between said field and armature and means coöperating with said generator-motor whereby that factor of power not required at the driven part may be transformed into the required factor of that power and applied to the driven part.

5. A power-transmission mechanism comprising a prime mover, a driven part, a device for transmitting an effort from the prime mover to the driven part, said device comprising two parts capable of movement with respect to each other and of generating and utilizing energy, and means operating on the driven part for receiving and applying said energy to decrease or augment the effort applied to the driven part.

6. A power-transmission mechanism comprising a prime mover, a driven part, a dynamo-electric machine having its field and armature interposed between the prime mover and driven part and both rotatable, and means for receiving and applying energy developed by the relative rotation of said field and armature to decrease or augment the effort applied to the driven part.

7. Power-transmission mechanism, comprising a dynamo-electric machine, having its armature and field-magnet each constructed for rotation for transmitting the effort of a prime mover to a driven part, a second dynamo-electric machine in electrical connection with the first and coöperating with said driven part, and means for operating the second machine as a motor or generator, substantially as described.

8. Power-transmission mechanism, comprising a dynamo-electric machine, having its armature and field-magnet each rotatable, and interposed between a prime mover and a driven part, a second dynamo-electric machine coöperating with said driven part and in electrical connection with the first, and means for automatically causing the second machine to operate as a motor or generator substantially as described.

9. A vehicle-propulsion system comprising a vehicle, an engine mounted thereon, a dynamo-electric machine mounted on the vehicle and having its armature and field-magnet interposed between the engine and the vehicle-wheel and both rotatable, and an electric storage battery carried by the vehicle interposed in the circuit of said armature and means for changing the direction and amount of the battery electromotive force for adding to and subtracting from the speed of the vehicle-wheel whereby it is rotated faster or slower than the engine.

10. A power-transmission mechanism comprising a dynamo-electric machine having its armature and field-magnet both rotatable and interposed between an engine and a driven part of which the speed is variable, an outside source and means for connecting the outside source in different ways, whereby the difference in energy applied to the driven part and that representing the load on the engine is stored, and from which it is supplied or restored to augment the energy on the driven part.

11. Power-transmission mechanism, comprising an engine, a driven part, a dynamo-electric machine, having its armature and field-magnet both rotatable and interposed between the two, a second dynamo-electric machine operating upon the driven part, connections for including the armatures of said machines in circuit, and a field-regulating device, substantially as described.

12. Power-transmission mechanism, comprising an engine, a driven part, a dynamo-electric machine, having its armature and field-magnet each rotatable, and interposed between the two, a second dynamo-electric machine operating upon the driven part, connections for including the armatures of said machines in circuit, and a field-regulating device responding to change of speed of the engine, substantially as described.

13. Power-transmission mechanism, comprising an engine, a driven part, a dynamo-electric machine, having its armature and field-magnet, both rotatable and interposed between the two, a second dynamo-electric machine operating upon the driven part, connections for including the armatures of said machines in the same circuit, a battery arranged for inclusion in and exclusion from said circuit, and a field-regulator and its connections responding to changes of speed of the engine, substantially as described.

14. Power-transmission mechanism, comprising an engine, a driven part, a dynamo-electric machine having its armature and field-magnet, both rotatable and interposed between the two and directly operating upon the driven part a second dynamo-electric machine operating upon the driven part, and a controller and its circuit connections for said dynamo-electric machines, substantially as described.

15. Power-transmission mechanism, comprising an engine, a driven part, a dynamo-electric machine having its armature and field-magnet, both rotatable, and interposed between the two, a second dynamo-electric machine, with one rotatable element, operating upon the driven part, field and armature circuits and a controller for said circuits.

16. A vehicle-propulsion system, comprising a prime mover, a dynamo-electric machine, having its field and armature both rotatable, and interposed between the prime mover and a driven part, means for closing the armature-circuit of the dynamo-electric machine whereby a loss of speed between the prime mover and the driven part is transferred into electric energy, and means for supplying electrical energy to said dynamo-machine whereby the application of electrical energy to the said dynamo-electric machine will result in a gain in speed of the driven part.

17. The combination with a generator-motor having a rotatable field and a rotatable armature, of an explosive-engine operatively connected with one part of said generator-motor forming the driving means, and auxiliary means operatively connected with the motor for starting the engine, substantially as set forth.

18. The combination with a generator-motor having a rotatable field and a rotatable armature, of an explosive-engine operatively connected with one part of said generator-motor and normally forming the driving means therefor, and an electric accumulator adapted to be put into circuit with said motor for starting the said engine.

In testimony whereof I have hereunto signed my name.

JUSTUS B. ENTZ.

In presence of—
W. J. JACKSON,
K. M. GILLIGAN.